(12) United States Patent
Seo

(10) Patent No.: US 10,749,189 B2
(45) Date of Patent: Aug. 18, 2020

(54) SEPARATOR MEMBRANE FOR FUEL CELL, METHOD FOR PREPARING SAME, AND FUEL CELL ELECTRODE ASSEMBLY

(71) Applicant: AMOGREENTECH CO., LTD., Gimpo-si (KR)

(72) Inventor: In Yong Seo, Seoul (KR)

(73) Assignee: AMOGREENTECH CO., LTD., Gimpo-si (KR)

(*) Notice: Subject to any disclaimer, the term of this patent is extended or adjusted under 35 U.S.C. 154(b) by 173 days.

(21) Appl. No.: 15/909,479

(22) Filed: Mar. 1, 2018

(65) Prior Publication Data

US 2018/0191002 A1 Jul. 5, 2018

Related U.S. Application Data

(63) Continuation-in-part of application No. PCT/KR2016/010514, filed on Sep. 21, 2016.

(30) Foreign Application Priority Data

Sep. 24, 2015 (KR) .................. 10-2015-0135184

(51) Int. Cl.
| | | |
|---|---|---|
| H01M 8/02 | (2016.01) | |
| H01M 8/10 | (2016.01) | |
| H01M 8/12 | (2016.01) | |
| H01M 8/0239 | (2016.01) | |
| H01M 8/1081 | (2016.01) | |
| H01M 8/1016 | (2016.01) | |
| H01M 8/1058 | (2016.01) | |
| H01M 8/1004 | (2016.01) | |
| H01M 8/1213 | (2016.01) | |
| H01M 8/0245 | (2016.01) | |

(52) U.S. Cl.
CPC ....... *H01M 8/0239* (2013.01); *H01M 8/0245* (2013.01); *H01M 8/1004* (2013.01); *H01M 8/1016* (2013.01); *H01M 8/1058* (2013.01); *H01M 8/1081* (2013.01); *H01M 8/1213* (2013.01); *Y02E 60/521* (2013.01); *Y02P 70/56* (2015.11)

(58) Field of Classification Search
None
See application file for complete search history.

(56) References Cited

FOREIGN PATENT DOCUMENTS

| | | |
|---|---|---|
| JP | 2009245639 | 10/2009 |
| KR | 20080035339 | 4/2008 |
| KR | 20110093714 | 8/2011 |
| KR | 20110120185 | 11/2011 |

(Continued)

OTHER PUBLICATIONS

International Search Report—PCT/KR2016/010514 dated Dec. 26, 2016.

*Primary Examiner* — Maria Laios
*Assistant Examiner* — Angela J Martin
(74) *Attorney, Agent, or Firm* — Cantor Colburn LLP

(57) ABSTRACT

Provided are a separator for a fuel cell, a method of manufacturing the same, and a fuel cell electrode assembly, in which the fuel cell separator includes: a support that is formed by accumulating fibers containing 20 wt % to 50 wt % of a fiber-forming polymer and 50 wt % to 80 wt % of a heat-resistant polymer, and has a plurality of pores; and an ion exchange resin filled in the plurality of pores of the support.

1 Claim, 3 Drawing Sheets

(56) References Cited

FOREIGN PATENT DOCUMENTS

| KR | 20130001294 | | 1/2013 | | |
|----|----|----|----|----|----|
| KR | 10-2014-0137198 | * | 12/2014 | ............. | H01M 4/86 |
| KR | 20140137198 | | 12/2014 | | |

* cited by examiner

SEPARATOR MEMBRANE FOR FUEL CELL, METHOD FOR PREPARING SAME, AND FUEL CELL ELECTRODE ASSEMBLY

TECHNICAL FIELD

The present invention relates to a separator for a fuel cell, and more particularly, to a separator for a fuel cell capable of preventing deformation of a support by a heat treatment process and preventing damage to the support by charging and discharging energy, a manufacturing method thereof, and a fuel cell electrode assembly.

BACKGROUND ART

Recently, an energy problem has become a big concern as the industry is highly developed.

Accordingly, there is a growing demand for new energy sources that are environmentally friendly and have high power.

The fuel cell is an energy conversion device that converts the chemical energy of fuel into electric energy. The fuel cell has high energy density and high efficiency, and is expected to be used as an environmentally friendly energy source.

The fuel cell generates electric energy from the chemical reaction energy of hydrogen contained in a hydrocarbon-based material such as methanol, ethanol, and natural gas and oxygen supplied from the outside. Depending on the kind of the electrolyte, the fuel cell is classified into a Phosphoric Acid Fuel Cell (PAFC), a Molten Carbonate Fuel Cell (MCFC), a Solid Oxide Fuel Cell (SOFC), a Polymer Electrolyte Membrane Fuel Cell (PEMFC), and the like.

Among the fuel cells, the Polymer Electrolyte Fuel Cell (PEMFC) has excellent output characteristics, can solve a corrosion problem by using a solid polymer membrane, has the quick start and response characteristics, and can obtain the high energy conversion efficiency and high current density at low temperature. Accordingly, the Polymer Electrolyte Fuel Cell (PEMFC) is applied in various fields such as an automobile power supply, distributed power supply, and small power supply.

Korean Patent Application Publication No. 10-2013-0001294 proposed a technique for preventing wrinkles from being formed in a solid polymer electrolyte membrane of a fuel cell by thermally transferring an electrode catalyst layer to either surface of the solid polymer electrolyte membrane using a protective film. Accordingly, it is possible to prevent the electrode catalyst layer from being peeled off by the wrinkles of the solid polymer electrolyte membrane. However, since the thermal expansion coefficient of the solid polymer electrolyte membrane is different from that of the electrode catalyst layer, the electrode catalyst layer may be peeled off from the solid polymer electrolyte membrane and the mechanical strength of the solid polyelectrolyte membrane may be lowered during charging and discharging, due to the heat generated when the fuel cell is driven. As a result, the fuel cell may be deformed or damaged to lower the reliability of the fuel cell.

DISCLOSURE

Technical Problem

The present invention has been made in view of the above-mentioned problems, and an object thereof is to provide a separator for a fuel cell, which can realize a support by a fiber containing a heat-resistant polymer and prevent the support from being deformed during a high-temperature heat treatment, a method of manufacturing the same, and a fuel cell electrode assembly.

Another object of the present invention is to provide a separator for a fuel cell, which can realize shrinkage and expansion of a support, which is a carrier of an ion exchange resin, during charging and discharging, thereby preventing damage to the support by charging and discharging energy, a method of manufacturing the same, and a fuel cell electrode assembly.

Technical Solution

In order to achieve the above object, according to an aspect of the present invention, there is provided a separator for a fuel cell, the fuel cell separator comprising: a support that is formed by accumulating fibers containing 20 wt % to 50 wt % of a fiber-forming polymer and 50 wt % to 80 wt % of a heat-resistant polymer, and has a plurality of pores; and an ion exchange resin filled in the plurality of pores of the support.

In the fuel cell separator according to an embodiment of the present invention, the fiber-forming polymer may be an elastic polymer fiber.

In the fuel cell separator according to an embodiment of the present invention, the thickness of the support may be in a range of 5 μm to 50 μm.

In the fuel cell separator according to an embodiment of the present invention, the sizes of the pores may be in a range of 0.2 μm to 1.5 μm.

In the fuel cell separator according to an embodiment of the present invention, the diameters of the fibers may be in the range of 500 nm to 1 μm.

According to another aspect of the present invention, there is provided a separator for a fuel cell, the fuel cell separator comprising: a support formed by accumulating fibers of an elastic polymer and having a plurality of pores; and an ion exchange resin filled in the plurality of pores of the support.

According to still another aspect of the present invention, an electrode assembly for a fuel cell includes a cathode, an anode, and a separator for the fuel cell interposed between the cathode and the anode.

According to a further aspect of the present invention, there is provided a method of manufacturing a separator for a fuel cell, the method comprising: preparing a spinning solution by mixing a polymer comprising a fiber-forming polymer and a heat-resistant polymer and a solvent; forming a support having a plurality of pores having a three-dimensional network structure by accumulating fibers obtained by electrospinning the spinning solution; filling the plurality of pores of the support with an ion exchange resin; and heat treating the support to make the ion exchange resin fixedly adhere into the plurality of pores.

In the method of manufacturing a separator for a fuel cell according to an embodiment of the present invention, the polymer fibers may contain 20 wt % to 50 wt % of a fiber-forming polymer and 50 wt % to 80 wt % of a heat-resistant polymer.

In the method of manufacturing a separator for a fuel cell according to an embodiment of the present invention, the heat treatment temperature may be in a range of 200° C. to 230° C.

In the method of manufacturing a separator for a fuel cell according to an embodiment of the present invention, the fiber-forming polymer may be an elastic polymer.

Advantageous Effects

As described above, in some embodiments of the present invention, although a high-temperature heat treatment step for making the ion exchange resin fixedly adhere into the pores of the support is performed by using the support formed by accumulating the fibers obtained by electrospinning the spinning solution containing the heat-resistant polymer, there is an advantage that deformation of the support can be prevented.

In some embodiments of the present invention, the ion exchange resin filled in the pores of the support fixedly adheres into the pores by performing the heat treatment process, thereby improving the filling rate of the ion exchange resin in the pores.

When the filling rate of the ion exchange resin is improved in the separator as described above, the ion exchange capacity is improved, and the performance of moving proton (P) generated in an anode by a supply of a fuel gas toward a cathode is improved. As a result, the performance of the fuel cell may be improved as the proton transferred through the separator and the oxygen of an oxidant gas supplied from the outside react with each other quickly and effectively at the cathode.

In some embodiments of the present invention, a support containing an ion exchange resin in pores is formed by accumulating fibers containing an elastic polymer. Accordingly, the support excellent in elasticity may be obtained, and the support may be shrunk and expanded upon charging and discharging of the fuel cell, to thereby prevent damage to the support.

In some embodiments of the present invention, since a plurality of pores of a support having a three-dimensional network structure formed between fibers are filled with and fixedly adhere to an ion exchange resin, it is possible to realize a fuel cell having excellent reliability by preventing desorption of the ion exchange resin.

BEST MODE

Hereinafter, embodiments of the present invention will be described in detail with reference to the accompanying drawings.

Figure 1:
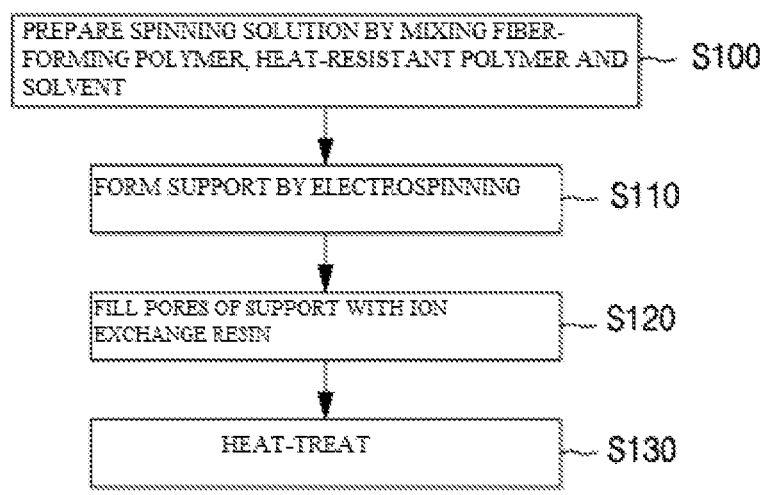
FIG. 1 is a flowchart of a method of manufacturing a separator for a fuel cell according to a first embodiment of the present invention.

Referring to FIG. 1, a method of manufacturing a separator for a fuel cell according to a first embodiment of the present invention includes: preparing a spinning solution by mixing a polymer containing 20 wt % to 50 wt % of a fiber-forming polymer and 50 wt % to 80 wt % of a heat-resistant polymer with a solvent (S100).

In some embodiments of the present invention, the polymer of the spinning solution is set to contain 50 wt % to 80 wt % of the heat-resistant polymer, and the heat-resistant temperature of the support prepared by electrospinning the spinning solution is increased to prevent deformation of the support even when the heat treatment is performed at a high temperature. Further, the viscosity of the ion exchange resin filled in the pores of the support by the heat treatment at a high temperature is increased to remove the flowability and make the ion exchange resin fixedly adhere into the pores, thereby improving a filling rate of the ion exchange resin in the pores of the support.

Here, when the polymer of the spinning solution contains less than 50 wt % of the heat-resistant polymer, the content of the heat-resistant polymer in the support is so small that heat treatment at 200° C. or higher is not nearly possible. When the polymer of the spinning solution contains more than 80 wt % of the heat-resistant polymer, it is difficult to spin the spinning solution and is not easy to form fibers during spinning.

Therefore, as in some embodiments of the present invention, when the spinning solution containing 20 wt % to 50 wt % of the fiber-forming polymer and 50 wt % to 80 wt % of the heat-resistant polymer is electrospun, the spinning property may be improved, the excellent fiber forming may be achieved, and the heat resistance characteristic that the fiber can endure even when the heat treatment is performed at 200° C. or higher may be increased.

The fiber-forming polymer may be any polymer capable of obtaining fibers by electrospinning. Examples of the polymer include polyvinylidene fluoride (PVdF), polymethyl methacrylate (PMMA), and the like.

The electrospinning may be performed by any electrospinning method including bottom-up electrospinning, top-down electrospinning, air spinning, or the like.

In some embodiments of the present invention, the fiber-forming polymer may be replaced with an elastic polymer. In this case, since the support is formed by accumulating fibers containing the elastic polymer and the heat-resistant polymer, the support that is not only deformed even at high-temperature heat treatment, but is also elastic may be implemented. Here, the elastic polymer is a polymer having properties that may be mixed with the heat-resistant polymer. For example, polyurethane which is a heat-resistant polymer resin and has excellent elasticity may be used as the elastic polymer.

The heat-resistant polymer resin may be any one selected from the group consisting of aromatic polyesters including polyamide, polyacrylonitrile (PAN), polyimide, polyamideimide, poly (meta-phenylene isophthalamide), polysulfone, polyether ketone, polyethylene terephthalate, polytrimethylene terephthalate, and polyethylene naphthalate; polyphosphazenes including polytetrafluoroethylene, polydiphenoxaphosphazenes, and poly {bis [2-(2-methoxyethoxy) phosphazene]}; polyurethane copolymers including polyurethane and polyether urethane; cellulose acetate; cellulose acetate butyrate; cellulose acetate propionate; polyester sulfone (PES); and polyether imide (PEI), and a combination thereof.

The solvent may employ at least one selected from the group consisting of DMAc (N, N-dimethyl acetoamide), DMF (N, N-dimethylformamide), NMP (N-methyl-2-pyrrolidinone), DMSO (dimethyl sulfoxide), THF (tetra-hydrofuran), EC (ethylene carbonate), DEC (diethyl carbonate), DMC (dimethyl carbonate), EMC (ethyl methyl carbonate), PC (propylene carbonate), water, acetic acid, formic acid, chloroform, dichloromethane, acetone, and isopropylalchol.

Thereafter, a support having a plurality of pores having a three-dimensional network structure is formed by accumulating fibers obtained by electrospinning the spinning solution (S110).

The support is a web in which fibers containing a fiber-forming polymer and a heat-resistant polymer are accumulated, and a plurality of pores of a three-dimensional network structure are formed between the fibers of the web.

The support is preferably set to have a thickness of 5 μm to 50 μm, and the pore size is preferably in a range of 0.2 μm to 1.5 μm. The fiber diameter of the support is preferably in a range of 200 nm to 1.5 μm, and more preferably in a range of 500 nm to 1 μm.

Next, the plurality of pores of the support are filled with an ion exchange resin (S120), and the support is heat-treated to make the ion exchange resin fixedly adhere to the plurality of pores (S130). In this case, for example, a fluorine-based resin may be used as the ion exchange resin.

The support serves as a carrier for filling the ion exchange resin into the pores. An exemplary method of filling the ion exchange resin into the plurality of pores of the support is to coat the ion exchange resin on the support and impregnate and fill the coated ion exchange resin into the plurality of pores of the support. Here, the ion exchange resin is flowable and is spontaneously moved to the plurality of pores of the support and filled in the pores of the support.

When the support is subjected to a heat treatment (or aging), the viscosity of the ion exchange resin filled in the pores becomes high and the flowability of the ion exchange resin is lost. Therefore, the ion exchange resin filled in the plurality of pores of the support fixedly adheres into the pores. Here, the fibers constituting the support contain 20 wt % to 50 wt % of the fiber-forming polymer and 50 wt % to 80 wt % of the heat-resistant polymer, and thus the heat treatment may be performed at a high temperature of 200° C. to 230° C. Further, deformation of the support does not occur even at a high-temperature heat treatment.

Figure 2:
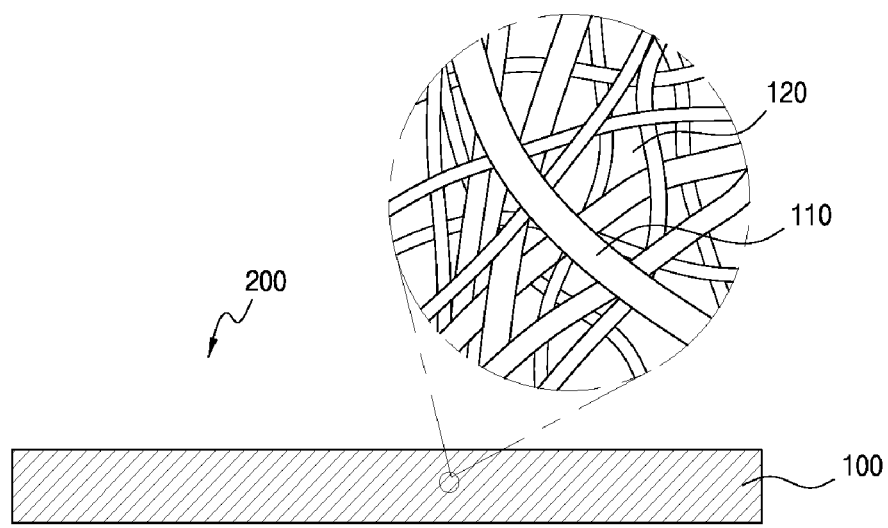
FIG. 2 is a view for explaining a structure of a separator for a fuel cell according to the first embodiment of the present invention.

Therefore, when the above-described manufacturing method is performed, as shown in FIG. 2, a fuel cell separator 200 may be implemented, in which the fuel cell separator includes a support 100 formed by accumulating fibers 110 containing 20 wt % to 50 wt % of a fiber-forming polymer and 50 wt % to 80 wt % of a heat-resistant polymer and having a plurality of pores and an ion exchange resin 120 filled in the plurality of pores of the support 100.

Figure 3:
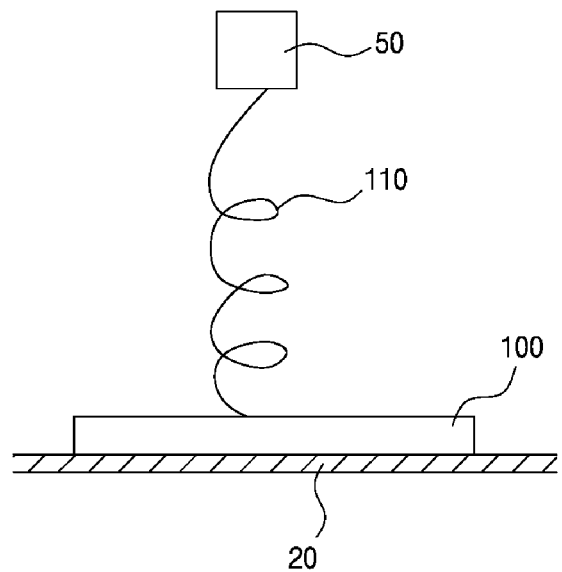
FIG. 3 is a conceptual cross-sectional view illustrating a method of forming a support by electrospinning according to a first embodiment of the present invention.

Referring to FIG. 3, the support 100 is formed by accumulating fibers 110 obtained by electrospinning a spinning solution in an electrospinning apparatus.

In this electrospinning apparatus, a spinning solution is supplied to a spinning nozzle 50, and a grounded collector 20 in the form of a conveyor moving at a constant speed is deployed spaced from and below the spinning nozzle 50.

When a high voltage electrostatic force is applied between the collector 20 and the spinning nozzle 50, the spinning solution is discharged into the fibers 110 from the spinning nozzle 50 and spun onto the collector 20. Then, the fibers 110 are accumulated on the collector 20 to form the support 100 of the web structure.

Figure 4:
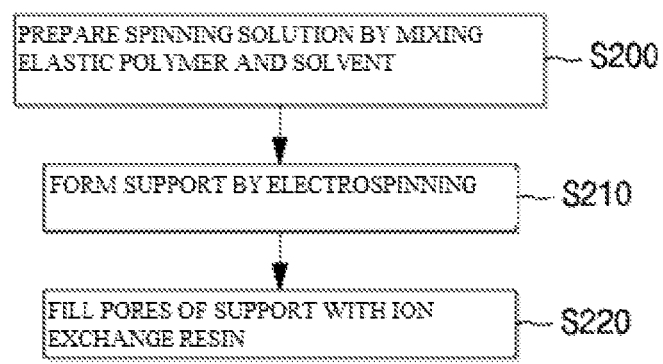
FIG. 4 is a flowchart of a method of manufacturing a separator for a fuel cell according to a second embodiment of the present invention.

Referring to FIG. 4, a method of manufacturing a separator for a fuel cell according to a second embodiment of the present invention will be described below. In step S200, a spinning solution is prepared by mixing an elastic polymer and a solvent. Then, the fibers obtained by electrospinning the spinning solution are accumulated thereby forming a support having a plurality of pores (S210). Subsequently, the pores of the support are filled with the ion exchange resin (S220).

Here, the process of heat-treating the support after filling the ion exchange resin in the pores may be selectively performed.

According to the second embodiment, the support is implemented by accumulating the fibers made of the elastic polymer. By the elastic fibers, the support is excellent in elasticity, so that the support may be shrunk and expanded during charging and discharging of the fuel cell. Therefore, there is an advantage that damage such as tearing of the support by charging and discharging energy may be prevented.

The fuel cell separator according to the second embodiment and manufactured by the above-described fuel cell separator manufacturing method includes: a support formed by accumulating fibers of an elastic polymer and having a plurality of pores; and an ion exchange resin filled in the plurality of pores of the support.

Figure 5:
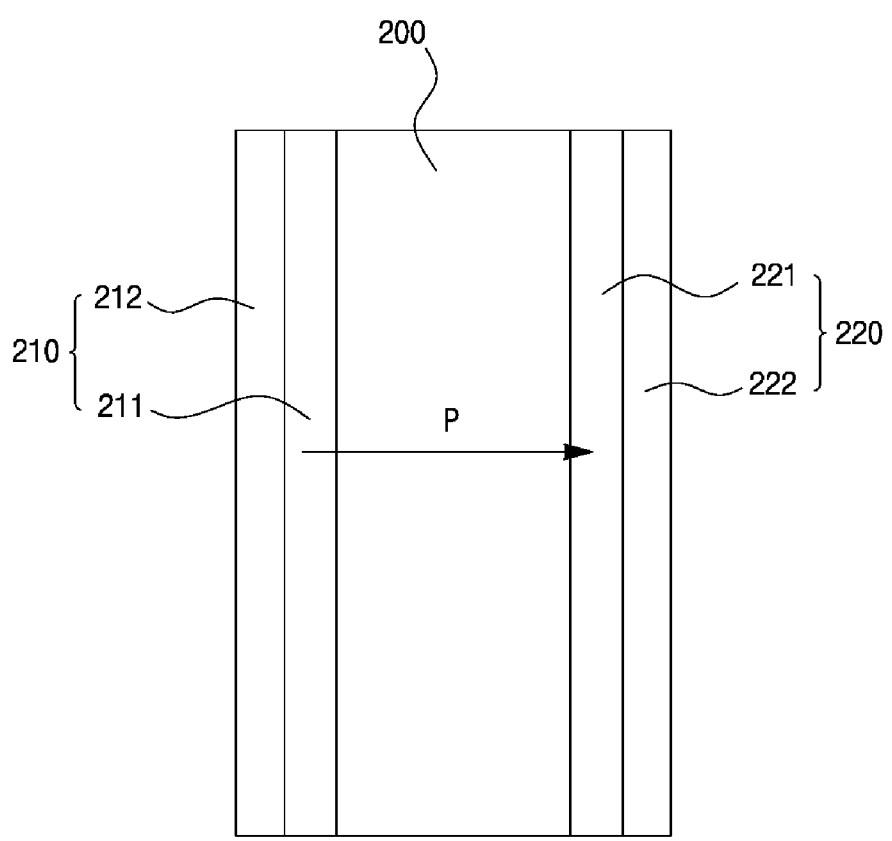
FIG. 5 is a cross-sectional view of an electrode assembly for a fuel cell according to an embodiment of the present invention.

Referring to FIG. 5, an electrode assembly for a fuel cell using a separator according to an embodiment of the present invention includes: an anode 210 to which a fuel gas containing hydrogen is supplied; a cathode 220 to which oxidant gas containing oxygen is supplied; and a fuel cell separator 200 deployed between the anode 210 and the cathode 220. Here, fibers containing a fiber-forming polymer and a heat-resistant polymer are accumulated to form a support having a plurality of pores, and an ion exchange resin serves as an electrolyte for moving proton P toward the cathode 220, in which the proton P is generated by the reaction of the fuel gas supplied to the anode 210. The ion exchange resin is filled into the pores of the support.

The anode 210 includes a catalyst layer 211 and a gas diffusion layer 212. The catalyst layer 211 containing a catalyst is in contact with and fixed to one side of the fuel cell separator 200, and the gas diffusion layer 212 is in contact with and fixed to the catalyst layer 211. A fuel gas is supplied to the gas diffusion layer 212 of the anode 210 and this fuel gas undergoes an electrochemical reaction with the catalyst of the catalyst layer 211 to generate proton P. The generated proton P moves in the cathode direction through the fuel cell separator 200.

The cathode 220 includes a catalyst layer 221 containing a catalyst and a gas diffusion layer 222, which are sequentially fixed to the other side of the fuel cell separator 200. An oxidant gas is supplied to the gas diffusion layer 222 and the catalyst of the catalyst layer 221 makes oxygen of the oxidant gas react with proton moved through the fuel cell separator 200 to produce water and electrons.

Therefore, an electric potential difference is generated between the anode and the cathode due to a chemical reaction between hydrogen and oxygen, so that current flows from the cathode to the anode, thereby obtaining electric energy and generating power.

In this case, an electrospinning process for forming a support of a pore structure and an electrospraying process for spraying droplets of an ion exchange resin into the pores to thus fill the former into the latter are alternately repeated to form a multi-layer structure, thereby maximizing a filling rate of the ion exchange resin.

As described above, in some embodiments of the present invention, although a high-temperature heat treatment step for making the ion exchange resin fixedly adhere into the pores of the support is performed by using the support formed by accumulating the fibers obtained by electrospinning the spinning solution containing the heat-resistant polymer, deformation of the support can be prevented. Thus, in some embodiments of the present invention, the ion exchange resin filled in the pores of the support fixedly adheres into the pores by performing the heat treatment process, thereby improving the filling rate of the ion exchange resin in the pores.

As a result, when the filling rate of the ion exchange resin is improved in the separator as described above, the ion exchange capacity is improved, and the performance of moving proton (P) generated in the anode 210 by a supply of a fuel gas toward the cathode 220 is improved. As a result, the performance of the fuel cell may be improved as the proton transferred through the separator 200 and the oxygen of an oxidant gas supplied from the outside react with each other quickly and effectively at the cathode 220.

The catalyst may react with the fuel gas and may apply any material capable of making proton and oxygen react with each other and may be made of one or more selected from the group consisting of platinum (Pt), ruthenium (Ru), a platinum ruthenium alloy (PtRu), palladium (Pd), rhodium (Rh), iridium (Ir), osmium (Os), and gold (Au). In addition, the catalyst is supported on a carrier and used. Carbon powder, activated carbon powder, graphite powder and the like are used as the carrier. The carrier carrying the catalyst may include a binder to maintain the adhesion between the separator and the gas diffusion layer.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention relates to a separator for a fuel cell capable of preventing deformation of a support by a heat treatment process and preventing damage to a support by charging and discharging energy, and can be applied to a separator for a fuel cell that can prevent the support from being deformed during the high-temperature heat treatment process by implementing the support with fibers containing a heat-resistant polymer.

What is claimed is:

1. A method of manufacturing a separator for a fuel cell, the method comprising:
   preparing a spinning solution by mixing a polymer comprising 20 wt % to 50 wt % of a fiber-forming polymer and 50 wt % to 80 wt % of a heat-resistant polymer, and a solvent, wherein the fiber-forming polymer is a fluorine-based elastic polymer;
   forming a support by electrospinning the spinning solution, the support being formed of accumulated electrospun fibers, wherein the support has a plurality of pores having a three-dimensional network structure;
   filling an ion exchange resin into the plurality of pores; and
   heat treating the ion exchange resin-filled support in a range of 200° C. to 230° C. to make the ion exchange resin fixedly adhere onto the plurality of pores.

\* \* \* \* \*